No. 876,039. PATENTED JAN. 7, 1908.
H. BURRELL.
HAND MIRROR.
APPLICATION FILED JULY 8, 1907.

WITNESSES.
Eman D. Drury
Bernard E. Drury

INVENTOR
Harold Burrell

UNITED STATES PATENT OFFICE.

HAROLD BURRELL, OF SHEFFIELD, ENGLAND.

HAND-MIRROR.

No. 876,039.   Specification of Letters Patent.   Patented Jan. 7, 1908.

Application filed July 8, 1907. Serial No. 382,780.

*To all whom it may concern:*

Be it known that I, HAROLD BURRELL, subject of the King of Great Britain and Ireland, residing at 10 York street, Sheffield, county of York, England, have invented certain new and useful Improvements in Hand-Mirrors and Like Mirrors, (for which or a portion thereof I have obtained protection in Great Britain, No. 16,456, July 21, 1906,) of which the following is a specification, reference being had to the accompanying drawing.

This invention, for a portion of which I have applied for a patent in Great Britain No. 16456, July 21, 1906, relates to improvements in hand mirrors and like mirrors having means for electrically illuminating objects to be reflected therein, such mirrors whether constructed to be held in the hand or to be carried upon a bracket, stand, or other fixture, being capable of being turned, revolved, or otherwise adjusted to suit the user, and with or without a concentrating lens as preferred.

The invention as applied to a hand mirror, for example, is illustrated in the annexed sheet of drawings to which reference will be made.

Figure 1:
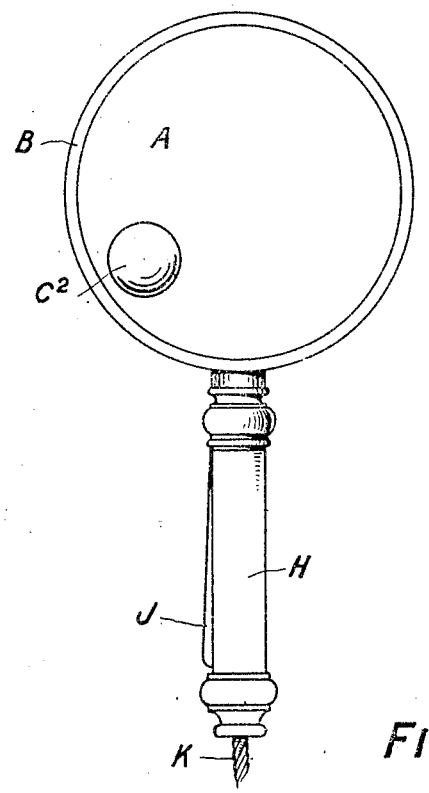
Figure 2:
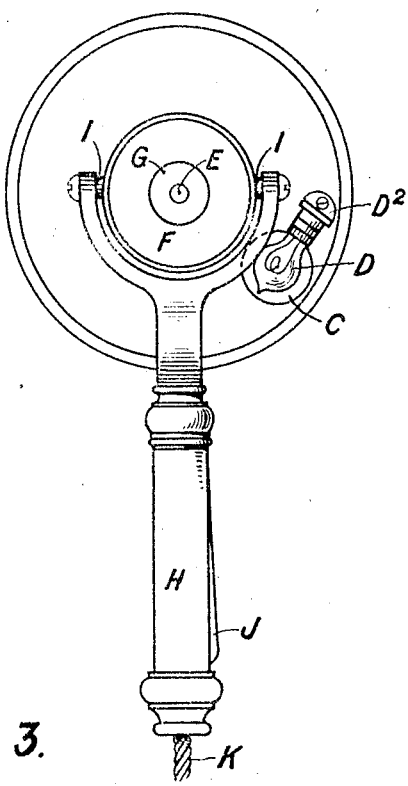
Figure 3:
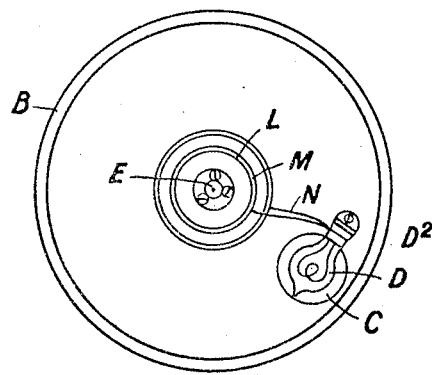
Figure 4:
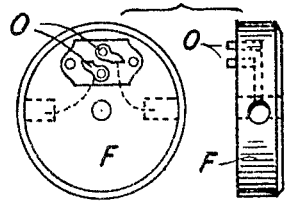

Figure 1, is a front elevation of a circular rotatable hand mirror. Fig. 2, back elevation of same. Fig. 3, back of mirror with contact block and handle removed. Fig. 4, two views of contact block, detached from mirror.

Referring to the drawings which represent a circular hand mirror A, capable of being swiveled to any angle, and of being rotated so as to bring the electric lamp to either side, or to any point of its circular path, the edge being protected by a circumferential metallic frame B. A space C, preferably circular is cleared from the amalgam and from any back covering, or a circular opening may be made through the glass and its cover if preferred, and a lens $C^2$, either affixed by cementation to the front of the mirror over such cleared space, or inserted in such opening, as the case may be, and secured therein by suitable means. If concentrated light is not required, the lens is dispensed with.

At the back of the cleared space or opening, and the lens, is fixed an electric lamp D, secured to the back covering of vulcanite, wood, or other non-conducting material by a bracket $D^2$, so that the light therefrom will be either concentrated and projected forward by the lens, or, if a lens is not used, will illuminate directly anything in front of the opening which will thus be reflected in the mirror. A metallic reflector may be fixed at the back of the electric lamp, serving also as a guard against accidental fracture of the glass bulb.

The mirror shown in Figs. 1 and 2, is intended to be held in the hand of the user, but it may be supported upon a bracket or a stand of any approved design, either fixed or portable, and in order that the mirror portion may be rotated or tilted in any direction without interfering with the continuity of the electric current and so that the light may be reflected or projected upon any part of the face (as would be required for example in shaving) it is further constructed as follows:—
Upon a center pin E, fixed to and projecting from the back of the mirror, is placed a contact block F, which is retained upon the said pin by an outside nut G, Fig. 2. To the block F, is pivotally secured a handle H, of any preferred design, the one shown being carried by trunnions or axes I, on each side, and is curved or shaped so as to pass over the electric lamp D, when the mirror is being revolved; the grip portion of the handle is provided with a switch lever J, by which the electric circuit is made or broken at will. The connecting electric wires K, may be carried direct to an electric supply or may be made detachable from the handle, and be connected by means of a plug fitting into a terminal at the end of the handle. Instead of the trunnions I, a ball and socket joint may be used if preferred.

Upon the non-conducting back of the mirror, and let in flush with its surface, are two insulated metallic rings or paths L, and M, connected by wires N, with the filament of the electric lamp D.

The block F, carries two spring actuated contacts O, which, when in position, travel upon the circular paths L, and M. Wires from these contacts pass from the block down one or both sides of the bow of the handle H, to the switch operated by the lever J.

If the mirror is not required to rotate but is only made to swivel, the trunnions or axes may be located on opposite sides of the mirror itself, and the block F, and circular paths L, and M, may be dispensed with.

I am aware that prior to this application a non-movable mirror in relation to its handle, has been devised having an electric lamp and a lens, and I therefore do not claim such, but What I do claim as my invention and desire to secure by Letters Patent, is:

1. The combination with a suitable support, of a mirror rotatable on said support and having a clear space at one point and an electric lamp carried by the mirror and arranged at the back of said clear space.

2. The combination with a suitable support and a mirror mounted on said support and rotatable thereon and having a clear space, of a lens arranged in registry with said clear space and an electric lamp carried by the mirror and disposed on the rear of said lens.

3. The combination with a suitable support, of a mirror, and a universal joint connection between the mirror and support whereby the mirror can be rotated and arranged at different angles relatively to the support, the mirror having a clear space and an electric lamp carried by the mirror and arranged in the rear of said clear space.

4. The combination with a rotatable mirror having a clear space, of an electric lamp located at the back of said clear space, a support on which said mirror is rotatably mounted a contact block pivotally connected to said support, spring contacts carried by said contact block, circular conductors carried by the mirror and wires connecting said conductors with the filament of said lamp.

5. The combination with a suitable support and a mirror swiveled on said support and having a clear space or opening, of an electric lamp arranged in the rear of said opening, electrical connections between the said lamp and said support and an electric switch carried by said support.

In witness whereof I have hereunto set my hand in presence of two witnesses.

HAROLD BURRELL.

Witnesses:
ALBERT E. LONGLEY,
ROBERT T. DRURY.